(12) United States Patent
Wilhelm et al.

(10) Patent No.: US 7,860,297 B2
(45) Date of Patent: Dec. 28, 2010

(54) METHOD AND APPARATUS FOR DETECTING THE DEFORMATION OF OBJECTS

(75) Inventors: Robert Wilhelm, Brannenburg (DE); Juni Sun, Raubling (DE); Rainer Huber, Piding (DE); Marcus Steinbichler, Neubeuern (DE); Volker Rasenberger, Raubling (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 1105 days.

(21) Appl. No.: 11/582,006

(22) Filed: Oct. 17, 2006

(65) Prior Publication Data

US 2007/0121121 A1 May 31, 2007

(30) Foreign Application Priority Data

Oct. 17, 2005 (DE) .................. 10 2005 049 607

(51) Int. Cl.
*G06K 9/00* (2006.01)
*G01N 21/00* (2006.01)

(52) U.S. Cl. .................. 382/141; 356/35.5; 356/237.2

(58) Field of Classification Search .................. 382/141, 382/130, 149, 236; 356/32, 237.1, 237.2, 356/35.5, 512, 513, 457, 496, 498
See application file for complete search history.

(56) References Cited

U.S. PATENT DOCUMENTS

| | | | | |
|---|---|---|---|---|
| 4,850,693 A | * | 7/1989 | Deason et al. | 356/35.5 |
| 5,155,363 A | * | 10/1992 | Steinbichler et al. | 250/227.2 |
| 5,467,184 A | * | 11/1995 | Tenjimbayashi | 356/35.5 |
| 6,417,916 B1 | * | 7/2002 | Dengler et al. | 356/35.5 |
| 6,577,383 B1 | * | 6/2003 | Mahner | 356/35.5 |
| 6,924,888 B2 | * | 8/2005 | Steinbichler et al. | 356/35.5 |
| 2002/0135751 A1 | * | 9/2002 | Steinbichler et al. | 356/35.5 |

* cited by examiner

*Primary Examiner*—Jon Chang
(74) *Attorney, Agent, or Firm*—Dilworth & Barrese, LLP

(57) ABSTRACT

In a method for detecting the deformation of objects (1), a sequence of pictures of the object (1) is taken with a measurement method during the deformation of the object (1). From the pictures, phase images are determined. To improve such method, there is formed the difference between the current phase image or the respective current phase image and the phase image of an initial state. This difference or these differences is/are evaluated and/or displayed on a visual display unit and/or stored.

19 Claims, 3 Drawing Sheets

METHOD AND APPARATUS FOR DETECTING THE DEFORMATION OF OBJECTS

BACKGROUND OF THE INVENTION

This invention relates to a method for detecting the deformation of objects, in which during the deformation of the object a sequence of pictures of the object is taken by means of a measurement method and phase images are determined from the pictures. The sequence of pictures of the object consists of at least two pictures. The invention furthermore relates to an apparatus for performing such method.

Methods and apparatuses of this kind, in which a phase image evaluation is employed, are used for various purposes. They are employed in methods and apparatuses for detecting the shape of objects or for vibration analysis. The methods and apparatuses can employ a projection of structured light, in particular a strip projection, or an illumination with coherent light, in particular laser light. They can be used in machine tool construction, in order to detect for instance the actual deflection on a bending machine or the strain of a specimen on a tensile testing machine. Further applications are found in machines and devices for detecting surface defects or surface anomalies such as dents, depressions, scratches and the like.

A method and an apparatus as mentioned above are used in particular in the non-destructive testing of materials, especially of composite materials, and in the testing of tires (vehicle tires). In doing so, an object, such as a material, composite, workpiece, tire or the like, is deformed, which can be effected by pressure, vacuum, heat or in some other way. The object is measured in various states of deformation. By means of the measurements it can be detected whether the object includes a defect, in particular a void.

For testing tires, the tire can be placed in a vacuum chamber. The tire can be mounted on a wheel rim or can be placed in the vacuum chamber without wheel rim. When the pressure is decreased, the air enclosed in a void of the tire leads to a local expansion, which can be detected by the measurement.

A method for measuring the surface of a three-dimensional body is known from EP 419 936 B1. According to this method, an object can be irradiated with coherent radiation, in particular laser light. The reflected radiation is imaged by an imaging optics in an image plane in which a sheet-like sensor or an image sensor is provided, preferably a CCD sensor. A reference radiation with a carrier frequency is superimposed on the sensor. The imaging optics is formed or adjusted such that the image of a speckle produced on the body by the coherent radiation covers at least three sensor elements (pixels) in the image plane. Thereby, it is ensured that a complete phase measurement is possible by taking a single picture. The phase of the radiation from the object is determined from the intensity signals of the sensor elements.

In the prior art method for detecting the deformation of objects, difficulties may arise when disturbances are superimposed on the defect-typical deformation. In this case, the distances between various interference lines can become very small, so that they can be distinguished only with difficulties or not at all, whereby the evaluation is made difficult or impossible.

From U.S. Pat. No. 5,467,184 there is known a method for detecting the deformation of objects on the basis of the speckle interferometry, in which speckle pictures are taken during various states of deformation of the object and stored. To be able to also detect large deformations, speckle pictures in various states of deformation are combined into groups. The difference between the first and the last picture of each group is formed, and these differences are summed up.

EP 1 215 465 A1 discloses a method and an apparatus as stated above, which provide for a reliable evaluation even with larger deformations.

SUMMARY OF THE INVENTION

It is the object underlying the invention to propose an improved method and an improved apparatus as mentioned above.

In accordance with the invention, this object is solved in a method as mentioned above by the features herein. During the deformation of the object, a sequence or series of pictures of the object is taken by means of a measurement method. From the pictures, phase images are determined. There is formed the difference between the current phase image or the respective current phase image and the phase image of an initial state. This difference or these differences is/are evaluated and/or displayed on a visual display unit. Instead or in addition, the differences can be stored, in particular for a future evaluation and/or representation.

By means of the invention, the significance of the pictures or images or phase images can be improved. It is possible to manually and/or automatically isolate only the relevant deformations from the time course of the total deformation. In addition, the picture quality can be improved and hence the evaluation can be facilitated.

If necessary, the difference or differences between the current phase image or the respective current phase image and the phase image of the initial state can be evaluated and/or be processed and/or be displayed on a visual display unit. In the evaluation or processing, spatial and/or time-based filter algorithms can be employed. The modulo-$2\pi$ phase image can be demodulated before being displayed on a screen.

According to the method of the invention, a relatively large number of pictures can be taken per unit time. In practical application it is possible to take the pictures with the usual video clock frequency of 25 frames per second.

It is, however, also possible to use other picture frequencies. In the case of slow deformations, picture frequencies of one picture per minute or even lower picture frequencies can be used. It is, however also possible to take the pictures with higher frequencies of up to one million pictures per second.

A specific phase image is used as starting image. Subsequently, the differences of the successive phase images with respect to the starting image are calculated. As a relatively large number of pictures is taken per unit time, these pictures and the associated phase images only differ from each other by a relatively small deformation. The pictures or phase images are taken during application of the load, i.e. during the progressive deformation. In this way, it can for instance be detected when a defect-typical deformation is completed, and the measurement can be terminated manually or automatically.

One advantage of the invention consists in the possibility of continuously observing the deformation on a visual display unit, e.g. a computer monitor, with reference to the phase difference images. As a result, the viewer can grasp the time sequence of individual deformations and, among other things, differentiate between slow and fast events. By selecting suitable initial states or reference states and associated pictures and phase images, individual segments of deformation can be displayed separately. These individual segments of deformation can be determined from image information or from external signals.

Advantageous embodiments are also described herein.

The pictures of the object can be taken with a method of interferometry. Suitable methods of interferometry include the holographic interferometry, the electronic speckle pattern interferometry (ESPI) or the speckle shearing interferometry. The pictures of the object can, however, also be taken with a projection method. In particular, a lattice projection method or a moiré method come into consideration.

The determination of the phase images can be effected for instance by the method of EP 419 936 B1, to which reference is made here expressly. According to this method, the phase image is determined from the picture on the CCD sensor, namely—as has already been explained above—such that the phase image is determined from a single picture. From the deformation pictures or interference line pictures taken directly, phase images are calculated, which then are evaluated by the described differentiation. When the respective phase image is determined from a single picture, as can be done according to EP 419 936 B1, the method can be accelerated considerably. It can be performed with the usual video clock frequency.

It is possible to determine and evaluate a demodulated phase image.

Another advantageous embodiment is characterized in that the object is irradiated with coherent radiation or coherent light, preferably laser light, or with partly coherent radiation of partly coherent light. In particular, the object can be irradiated by a laser diode. According to another advantageous embodiment, the object is irradiated by a plurality of laser diodes. The use of one or more laser diodes is advantageous in particular, because laser diodes are relatively inexpensive. When using a plurality of laser diodes, the arrangement can be made such that the illumination areas of the laser diodes do not overlap each other or only overlap each other slightly in marginal areas. It is, however, also possible to make the arrangement such that the illumination areas of two or more or all laser diodes overlap each other.

A particular advantage of the method of the present invention consists in that additional information can be obtained from further pictures and/or phase images, which are taken or determined during the deformation, and/or from the differences thereof. By means of statistical or telecommunications methods, the quality of the measurement can be determined from the pictures and/or phase images and/or the differences thereof at the initial and/or final states and/or among each other in each image area. By means of this quality information it is possible, for instance, to rework the result images and thereby facilitate the evaluation. The additional information obtained, in particular the quality criteria for individual image areas, can be used for improving the representation and/or the detection of features.

Another advantageous embodiment is characterized in that successive segments of deformation are detected manually or automatically and/or are separated. In particular, defect-typical deformations can be detected manually or automatically and/or be separated from whole-body movements and/or whole-body deformations. There can be performed an automated detection of features.

The phase images taken and/or the phase difference images formed from the phase images can be visualized as a film.

It is possible to compare any time segments and/or partial segments of the deformation with each other.

Furthermore, it is possible to separate the whole-body deformation or an undesired deformation from the desired deformation.

Another advantageous embodiment is characterized in that the evaluation and/or representation of the difference between the current phase image or the respective current phase image and the phase image of an initial state is effected at a time and/or within a time segment, at/in which the whole-body deformation or an undesired deformation has again assumed a lower value after a higher value. At this time or within this time segment, the amount of desired deformation is higher, so that the deformation of the object can be detected better and/or defects of the object can be detected better.

According to another advantageous embodiment, partial areas of the phase images and/or phase difference images are compared with neighboring areas of the phase images or phase difference images. The partial areas can be one or more picture elements (pixels). The partial areas can fill part of or the entire phase image or phase difference image. The neighboring area can consist of one or more picture elements. In particular, the neighboring area(s) is/are formed by the direct vicinity of the partial area.

According to this advantageous embodiment, partial areas with little significance are eliminated. The significance of the partial area can be determined in particular by statistical methods. The elimination of a partial area with little significance can in particular be effected in that the values of this partial area are replaced by values from the surroundings, in particular from the direct vicinity.

The object underlying the invention is solved in an apparatus for detecting the deformation of objects by the features herein The apparatus comprises a measurement means for taking a sequence of pictures of the object during the deformation of the object, a means for determining phase images from the pictures taken, an evaluation means for forming the difference between the current phase image or the respective current phase image and the phase image of an initial state, and an evaluation means and/or an image display unit and/or a memory for evaluating and/or displaying and/or storing this difference or these differences.

Advantageous embodiments of the apparatus of the present invention are also described herein.

In particular, the apparatus of the present invention can include one or more means for performing the advantageous method features.

BRIEF DESCRIPTION OF THE DRAWINGS

One embodiment of the invention will be explained in detail below with reference to the accompanying drawing, in which.

DESCRIPTION OF THE PREFERRED EMBODIMENTS

Figure 1:
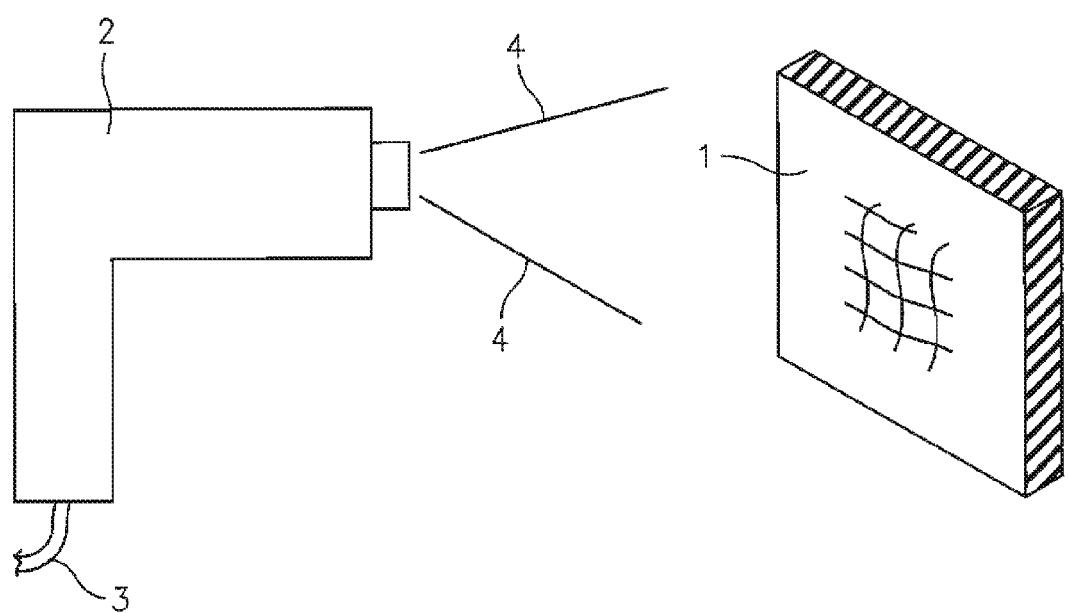
FIG. 1 shows a measurement means and an object in a schematic representation.

As shown in FIG. 1, an object 1, e.g. a tire or a composite material, is continuously observed by means of a measuring head 2. The object 1 is deformed, e.g. by pressure, vacuum, heat or the like. Via a line 3, the measuring head 2 is connected with an evaluating device, e.g. a PC or other computer.

The measuring head can be a device which operates according to the method described in EP 419 936 B1. The measuring head 2 includes laser diodes which irradiate the object 1 with laser light 4.

The measuring head 2 continuously takes pictures of the object 1. This occurs during the deformation of the object 1.

For taking the pictures, a CCD sensor is provided in the measuring head 2. The pictures are taken with a video clock frequency (25 frames per second) or also—depending on the application—with a lower or higher frequency.

From the pictures, phase images are constantly calculated. This is preferably effected by a 1-image technique (spatial phase shift). Thus, a phase image is calculated from each picture. This can be done according to the method described in EP 419 936 B1. A picture of the object 1 in the state of rest is not required. Instead of the 1-image technique, it is, however, also possible to perform a time-based phase shift, in which one phase image is each calculated from several, generally three or four pictures taken one after the other, or to use several cameras which each take one phase-shifted picture, from which pictures a phase image is then calculated.

The differences of the continuously taken phase images with respect to the starting image describe the $2\pi$-modulated total deformation between the starting time and the recording times.

Any partial segments of a deformation can be observed individually. This can be expedient in particular when a plurality of deformation processes offset in time or at different speeds are superimposed on each other to obtain a total deformation.

In the non-destructive testing of materials, a typical "whole-body deformation" frequently overlies the actually examined, atypical deformation of a workpiece. In many cases, the dimension of this whole-body deformation is larger than that of the defect sought for in the object. Therefore, it is often difficult to detect the defect, because the superimposed global deformation leads to a confusing display of a result image and overlies the defect actually sought for.

This will be explained with reference to an example in which tires with defects are placed in a vacuum chamber. The defects increase with decreasing pressure in the vacuum chamber. They can be made visible by means of shearography. The deformation caused by the defects is the "desired" deformation, which should be detected and be made visible. After a deformation, which can be caused e.g. by placement in the testing chamber, the tires usually slowly assume their original shape. This is the "undesired whole-body deformation", which overlies the atypical, desired deformation that should actually be examined. When testing tires, this whole-body deformation is largely independent of the applied vacuum.

Figure 2:
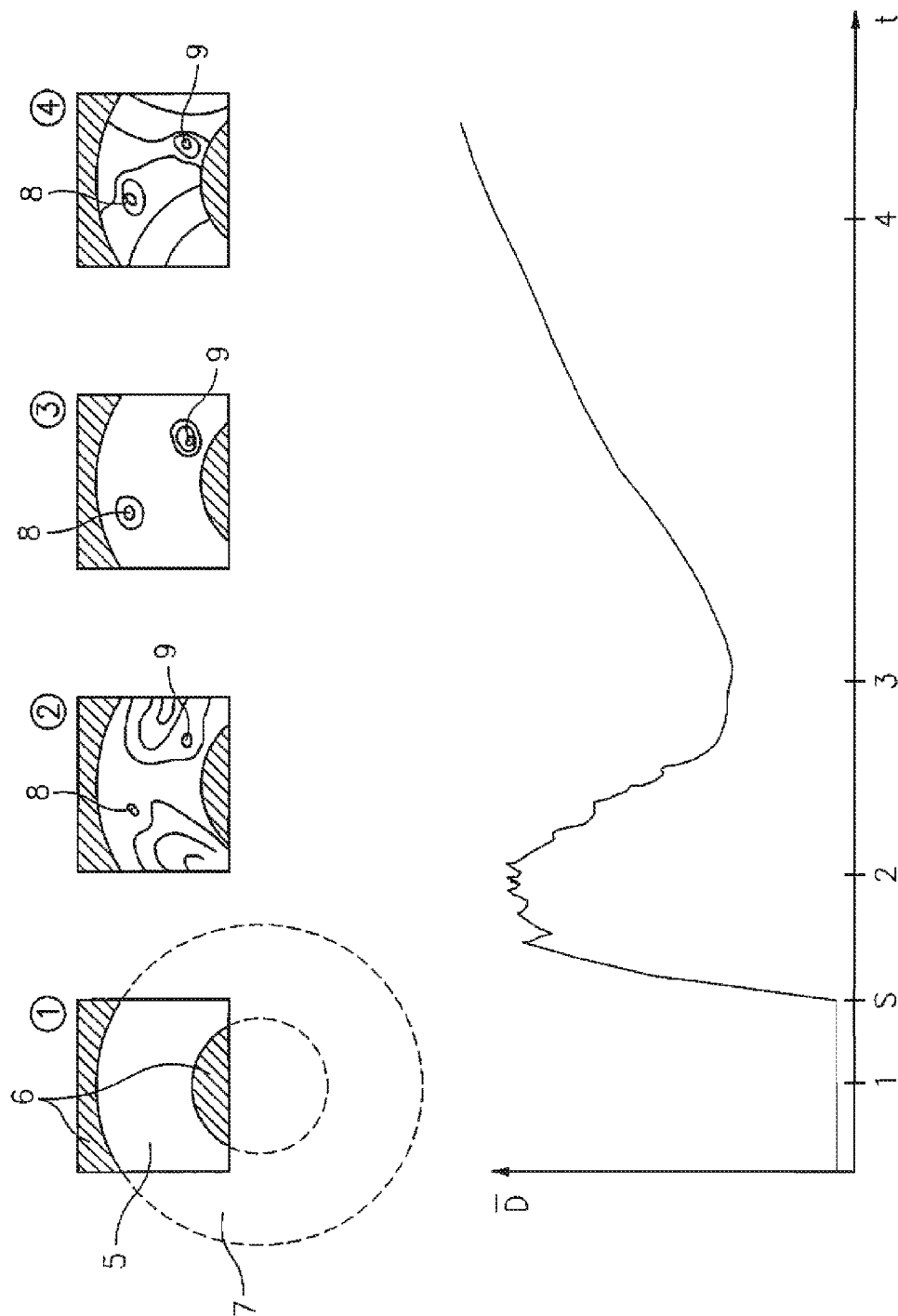
FIG. 2 shows the time course of the deformation of a tire in a tire testing device.

FIG. 2 shows the time course of the deformation of part of a sidewall 5 of a tire 7, namely a car tire, which is not mounted on a wheel rim and which is placed in a vacuum chamber in which it lies flat on a base 6.

At the time 1, the tire 7 rests on the base 6. At the time S, vacuum is applied to the tire 7 by producing such vacuum in the vacuum chamber. At the time S, the load is applied, which will subsequently produce the deformation of the tire 7. The vacuum is increased up to the time 2, so that the load is increased up to this time 2.

The average total deformation D exhibits the time course shown in the lower part of FIG. 2. In the state of rest, i.e. at the time 1 prior to the load change S, the average total deformation D is zero. During the load change, i.e. from the time S of the beginning of the load up to the complete application of the vacuum load at the time 2, the average total deformation D first shows a steep increase and then changes into vibrations around an increased value of the average total deformation D. Subsequently, the average total deformation D decreases, until it reaches a minimum at the time 3, whereupon it slowly increases again (time 4).

In the upper part of FIG. 2, the associated phase images for a partial area of the sidewall 5 of the tire 7 are each illustrated. At the time 2, the average total deformation D is relatively large, so that the desired deformation is relatively small. Accordingly, the voids 8, 9 cannot easily be detected, as they are surrounded by a relatively large number of contour lines, which represent the undesired deformation. At the time 3, the disturbances have largely subsided. The undesired deformation reaches a minimum, and the desired deformation reaches a relative maximum. Here, the voids 8, 9 are clearly detectable. The detectability of the voids 8, 9 decreases thereafter, as for instance at the time 4 contour lines for the undesired deformation appear again.

When vacuum is applied to the tire 7 quickly enough, the desired deformation is achieved within a very short time, whereas the undesired deformation is effected relatively slowly. By observing the total deformation, i.e. the average total deformation D in the lower part of FIG. 2, different segments of deformation can be resolved in time. When testing tires, it can, for instance, be observed that the mean deformation D in the image segment observed is very large at the beginning of the load change, i.e. between the times S and 2. In addition to the described desired and undesired deformations, reversible disturbances occur, as the tire 7 is caused to vibrate as a result of the sudden change in pressure. These vibrations quickly subside, however, after the time 2. After these vibrations or disturbances have subsided, the mean deformation D reaches a minimum at the time 3. At this time, the desired deformation exists almost exclusively, and the undesired deformation has reached a minimum. Preferably, the evaluation and/or representation is effected at this time, at which the whole-body deformation or the undesired deformation has again assumed a lower value after a higher value at the time 2. After the time 3, the mean value of the deformation D in the observed image segment increases again with the increase of the undesired deformation.

By measuring the deformation during a change in vacuum in accordance with the invention, the total deformation combined of a desired and an undesired component is measured. By means of a statistical observation of the individual result images, the load period between initial state and final state can be chosen such that the desired component is fully developed, whereas the undesired component (undesired whole-body deformation) is hardly developed.

As a criterion for evaluating and/or displaying the time course of the deformation, the mean deformation in the differential phase image can be used, as mentioned above. Instead of the mean deformation D, other quantities can be used as well, such as the standard deviation or another mathematical function or statistical quantity from the differential phase image. Another usable criterion can be formed by a comparison, for instance by a difference of successive pictures and/or phase images and/or phase difference images. Another usable criterion can be derived from an initial video image. It is also possible to use external signals. The various criteria and/or signals can be combined.

FIG. 2 shows individual segments of the deformation with reference to typical differential phase images (in the upper part of FIG. 2) and a diagram with the time course of the mean deformation D (in the lower part of FIG. 2). In this example, the test specimen is a car tire 7, whose sidewall is tested segment by segment in individual sectors. In the camera pictures 1 to 4 a partial area of the sidewall 5 can be seen as well as parts of the base 6 on which the tire rests. The camera pictures 1 to 4 show different recording times 1 to 4, namely in the state of rest 1 prior to the load change S, during the load change 2, after the disturbances have subsided in the minimum 3 of the total deformation and during the increase of the undesired deformation 4. The time chart in the lower part of FIG. 2 illustrates the course of the average total deformation D with the respective recording times 1 to 4.

Another advantage which can be achieved with an advantageous embodiment of the method of the invention consists in the improvement of the picture quality. This will be explained below with reference to FIG. 3, which illustrates the time course of the values of 9 adjacent picture elements R1 to R9 at 26 successive recording times 1 to 26. The values are phase difference values which are represented by grey tones. The height of each bar corresponds to the respective grey tone.

The picture elements R1, R3, R4, R5, R7, R8 and R9 each show a similar grey scale, which at the recording time 1 is about 200 and decreases to about 100 by the recording time 26. The grey tones of the picture elements R2 and R6 considerably differ therefrom, and they fluctuate very much. According to an advantageous embodiment of the invention, the partial areas of the phase difference images, which are formed by the picture elements R2 and R6, can be compared with the respective neighboring areas, and these partial areas R2 and R6 with little significance can be eliminated. This can be effected in that the grey tones for the picture elements R2 and R6 are replaced by mean values from the surroundings, in particular from the direct vicinity of these picture elements.

Figure 3:
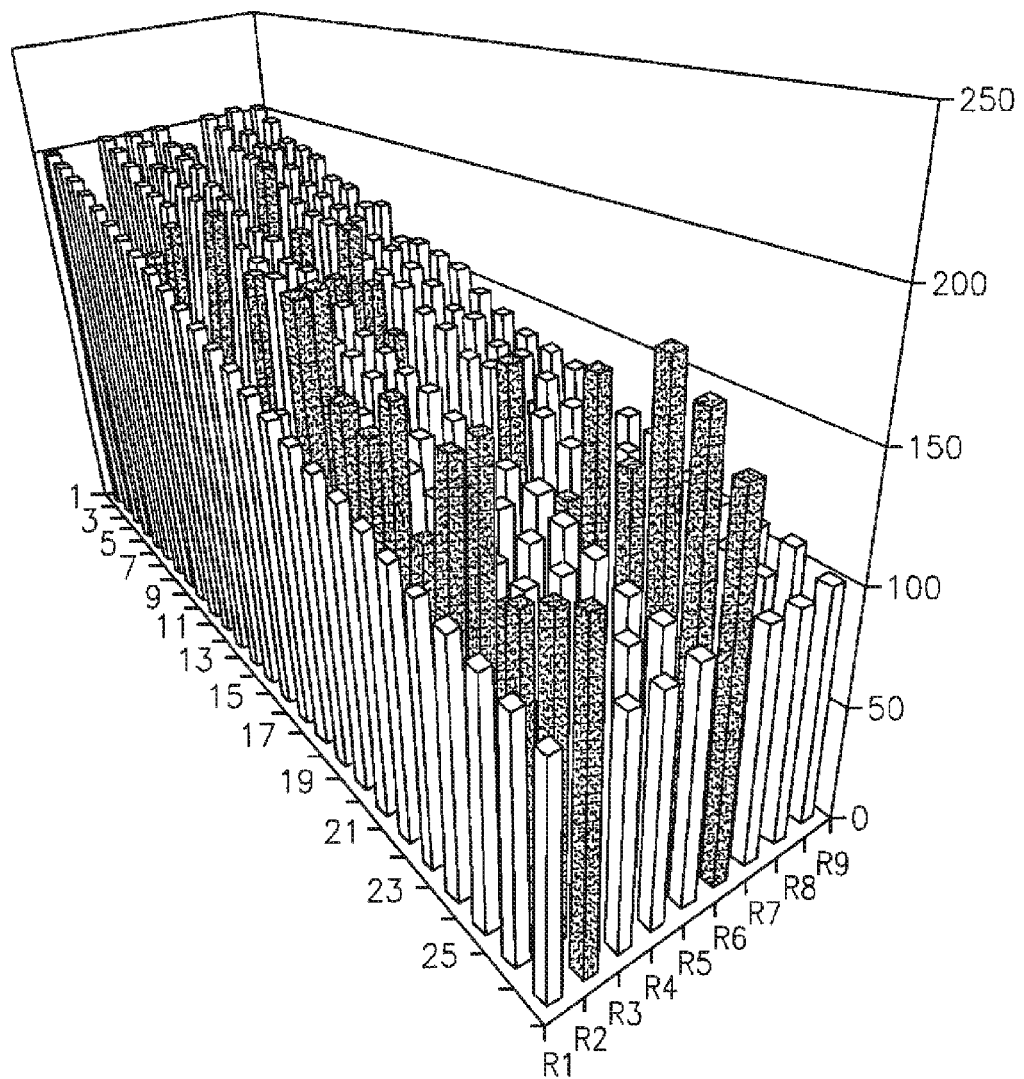
FIG. 3 shows the time course of the phase difference values of 9 adjacent picture elements at 26 successive recording times.

In the embodiment as shown in FIG. 3, the partial areas of the phase difference images, which are compared with the neighboring areas and are eliminated in the case of little significance, are formed by one picture element each, namely by the picture element R2 and the picture element R6. It is, however, also possible to combine several picture elements to a partial area to be compared with one or more neighboring areas.

By means of the advantageous embodiment of the invention, the picture quality can be improved. It is possible to examine successive phase images or differential phase images for local differences. In areas with great deformations, great changes in the local grey tones are expected, whereas in areas with minor deformations only minor changes in the local grey tones are to be expected. When locally great changes occur, which in the direct vicinity are, however, relatively small, this is an indication of little significance of the examined partial areas. By eliminating the results of these partial areas, the picture quality of the pictures formed from these results can be improved distinctly, without too much impairing defect-typical deformations with a small spatial, lateral expression. The significance of the partial areas can be determined by statistical methods and/or mathematical methods and/or mathematical functions.

This is illustrated by the bar chart as shown in FIG. 3. While most of the picture elements exhibit a similar grey scale, the grey tones of the picture elements R2 and R6 fluctuate considerably. They are regarded as statistically independent of the total deformation and replaced by mean values from the surroundings, whereby distinctly improved result images are obtained.

The invention claimed is:

1. A method for analyzing an object, the method comprising the steps of:
deforming the object;
taking a sequence of pictures of the object during the deformation using a camera;
determining phase images from the pictures by a computer,
determining the difference between the current phase image or the respective current phase image and the phase image of an initial state by the computer;
displaying the difference on a visual display unit, and
wherein an evaluation and/or representation of the determined difference between the current phase image or the respective current phase image and the phase image of an initial state by the computer is effected at a time at which a whole-body deformation or an undesired deformation has assumed a lower value after assuming a higher value.

2. The method as claimed in claim 1, wherein the pictures of the object are taken with holographic interferometry or electronic speckle pattern interferometry (ESPI) or with speckle shearing interferometry.

3. The method as claimed in claim 1, wherein the pictures of the object are taken with a lattice projection method or with a moire method.

4. The method as claimed in claim 1, wherein the phase images is determined from a picture.

5. The method as claimed in claim 1, wherein the object is irradiated with coherent radiation, including coherent light or laser light, or with partly coherent radiation, including partly coherent light.

6. The method as claimed in claim 1, wherein the object is irradiated by one or more laser diodes.

7. The method as claimed in claim 1, wherein from two or more successive pictures and/or phase images and/or the differences thereof additional information is obtained, by statistical or telecommunications methods.

8. The method as claimed in claim 1, wherein successive deformation sections are detected manually or automatically and/or are separated, wherein in particular defect-typical deformations are separated from whole-body movements and/or whole-body deformations.

9. The method as claimed in claim 8, wherein an automated detection of features is performed.

10. The method as claimed in claim 1, wherein the phase images and/or the phase difference images formed from the phase images are visualized as a film.

11. The method as claimed in claim 1, wherein time segments and/or partial segments of the deformation are compared with each other.

12. The method as claimed in claim 1, wherein a whole-body deformation or an undesired deformation is separated from the desired deformation.

13. The method as claimed in claim 1, wherein areas of the phase images and/or the phase difference images are compared with neighboring areas and that partial areas with little significance are eliminated.

14. An apparatus for detecting the deformation of objects, the apparatus comprising:
a camera effective to take a sequence of pictures of the object during the deformation of the object,
a computer effective to determine phase images from the pictures taken, and to determine a difference between the current phase image or the respective current phase image and the phase image of an initial state,
wherein an evaluation and/or representation of the determined difference between the current phase image or the respective current phase image and the phase image of an initial state by the computer is effected at a time at which a whole-body deformation or an undesired deformation has assumed a lower value after assuming a higher value, and
a visual display unit effective to display the difference or the differences.

15. The apparatus as claimed in claim 14, wherein the camera comprises an interferometer and/or a projector and/or a source of coherent radiation or coherent light or partly coherent radiation or partly coherent light.

16. The apparatus as claimed in claim 15, comprising one or more laser diodes.

17. The apparatus as claimed in claim 16, comprising means for visualizing the pictures taken and/or the phase images and/or the phase images and/or the phase difference images as a film.

18. The apparatus as claimed in claim 14, comprising one or more laser diodes.

19. The apparatus as claimed in claim 14, comprising means for visualizing the pictures taken and/or the phase images and/or the phase difference images as a film.

* * * * *